(12) United States Patent
Hilgert et al.

(10) Patent No.: US 6,521,837 B2
(45) Date of Patent: Feb. 18, 2003

(54) ELECTRICAL BUSWAY HOUSING SYSTEM AND CONNECTION MEANS THEREFOR

(75) Inventors: Brian Louis Hilgert, Bridgeville, PA (US); Edward James Schultz, Pittsburgh, PA (US)

(73) Assignee: Universal Electric Corporation, Bridgeville, PA (US)

(*) Notice: Subject to any disclaimer, the term of this patent is extended or adjusted under 35 U.S.C. 154(b) by 0 days.

(21) Appl. No.: 09/792,503

(22) Filed: Feb. 23, 2001

(65) Prior Publication Data

US 2002/0117322 A1 Aug. 29, 2002

(51) Int. Cl.⁷ ................................................ H02G 5/00
(52) U.S. Cl. .................. 174/99 B; 174/88 B; 174/68.2; 174/70 B; 174/72 B; 174/99 E; 174/149 B
(58) Field of Search ........................ 439/213; 174/71 B, 174/88 B, 68.2, 70 B, 72 B, 99 B, 99 E, 149 B (56) References Cited

U.S. PATENT DOCUMENTS

| 2,345,650 A | 4/1944 | Attwood |
| 2,380,379 A | 7/1945 | Attwood |
| 2,737,268 A | 3/1956 | Smith |
| 2,969,421 A | 1/1961 | Scott, Jr. |
| 3,031,217 A | 4/1962 | Tinnerman |
| 3,210,716 A | 10/1965 | Meacham |
| 3,287,487 A | * 11/1966 | Fehr .......................... 174/71 B |
| 3,489,981 A | * 1/1970 | Corl et al. ................... 439/116 |
| 3,493,025 A | 2/1970 | la Londe et al. |
| 3,509,514 A | 4/1970 | Christensen et al. |
| 3,636,233 A | * 1/1972 | Swampillai et al. ...... 174/16 B |
| 3,710,301 A | * 1/1973 | Weimer ..................... 339/22 B |
| 3,987,877 A | * 10/1976 | Bulanchuk ................. 191/23 A |
| 4,950,841 A | * 8/1990 | Walker et al. ............ 174/88 B |
| 5,760,339 A | * 6/1998 | Faulkner et al. .......... 174/88 B |
| 5,785,542 A | * 7/1998 | Johnson ...................... 439/213 |
| 6,039,584 A | 3/2000 | Ross |
| 6,105,741 A | 8/2000 | Ross |
| 6,176,720 B1 | * 1/2001 | Johnson ...................... 439/213 |
| 6,224,035 B1 | * 5/2001 | Parkhe et al. ................. 254/28 |
| 6,296,498 B1 | * 10/2001 | Ross .......................... 439/115 |

* cited by examiner

Primary Examiner—Dean A. Reichard
Assistant Examiner—Jinhee J Lee
(74) Attorney, Agent, or Firm—DKW Law Group, P.C.; Terry L. Schnell; William P. Smith (57) ABSTRACT

An electrical busway housing system mechanically connected at the joints of adjoining housing sections by utilization of a coupling system having a top plate and a bottom plate, at least one of which has a roughened surface that provides superior gripping strength when the adjoining sections of busbar housing are clamped between them. Frictional clamping force is provided by a means of drawing the top plate and the bottom plate together and securing between them flanges or similar structural features of the busbar housing.

8 Claims, 9 Drawing Sheets

ELECTRICAL BUSWAY HOUSING SYSTEM AND CONNECTION MEANS THEREFOR

FIELD OF THE INVENTION

This invention relates to an electrical busway housing system capable of conducting electricity and mechanical connection means therefor, and more particularly, to an electrical busway housing system mechanically connected at the joints of adjoining housing sections by utilization of a coupling system having a top plate and a bottom plate, at least one of which has a roughened surface that provides superior gripping strength when the adjoining sections of busbar housing are clamped between them.

BRIEF DESCRIPTION OF PRIOR ART

Electrical busway, also known as elongated electrical distribution busway, is well known in the art. An electrical busway housing system is typically comprised of multiple pieces of track connected end to end with one or more electrically-isolated, conductive busbars fastened to the housing, such that the system is capable of conducting electricity end to end through the busbars. The busbar is adapted to permit electrical power tap-off at any point along the length of the busbar. Such busbar is often provided overhead, or may be provided along walls or flooring, and is used to distribute electricity to various take-off devices to equipment, appliances, lighting or other articles requiring a source of electrical energy to operate. For example, when installed in a home or office setting, it is often used to permit lighting and/or electrical sockets to be placed in one or more locations along the electrical busway. When installed in a factory or other industrial application, electrical sockets, lighting or other industrial devices may be placed on, near or along the busway to obtain electrical current from the busway.

Electrical power distribution tracks or busways are typically comprised of an elongated housing containing multiple electrically isolated conductive busbars. Sections of the track can be joined together to form long runs for the power distribution, and such sections may be of any length, but are generally anywhere from two (2) to twenty (20) feet long each. The joining of two twenty foot sections to one another, for example, provides 40 feet of electrical busbar, and the process can be repeated as necessary to provide electrical busway of substantial length.

While not limited to the use of aluminum housings, aluminum busbar housing generally tends to be the housing of choice due to its light weight, great strength and economical cost and ease of manufacture.

The joining of the individual sections must provide for making both mechanical and electrical connections from one section of housing to the adjoining section. This is generally accomplished with a coupler, also known, among other terms, as a coupling system, a connecting system, a coupling assembly, or a connector assembly. There are several known approaches to this coupling system. Examples include U.S. Pat. No. 2,969,421, to Sott, Jr; U.S. Pat. No. 3,210,716 to Meacham; U.S. Pat. No. 3,509,514 to Christensen et al.; U.S. Pat. No. 6,039,584 to Ross and U.S. Pat. No. 6,105,741 to Ross, with certain of these patents focusing on the mechanical connection, the electrical connection or both.

Figure 1A:
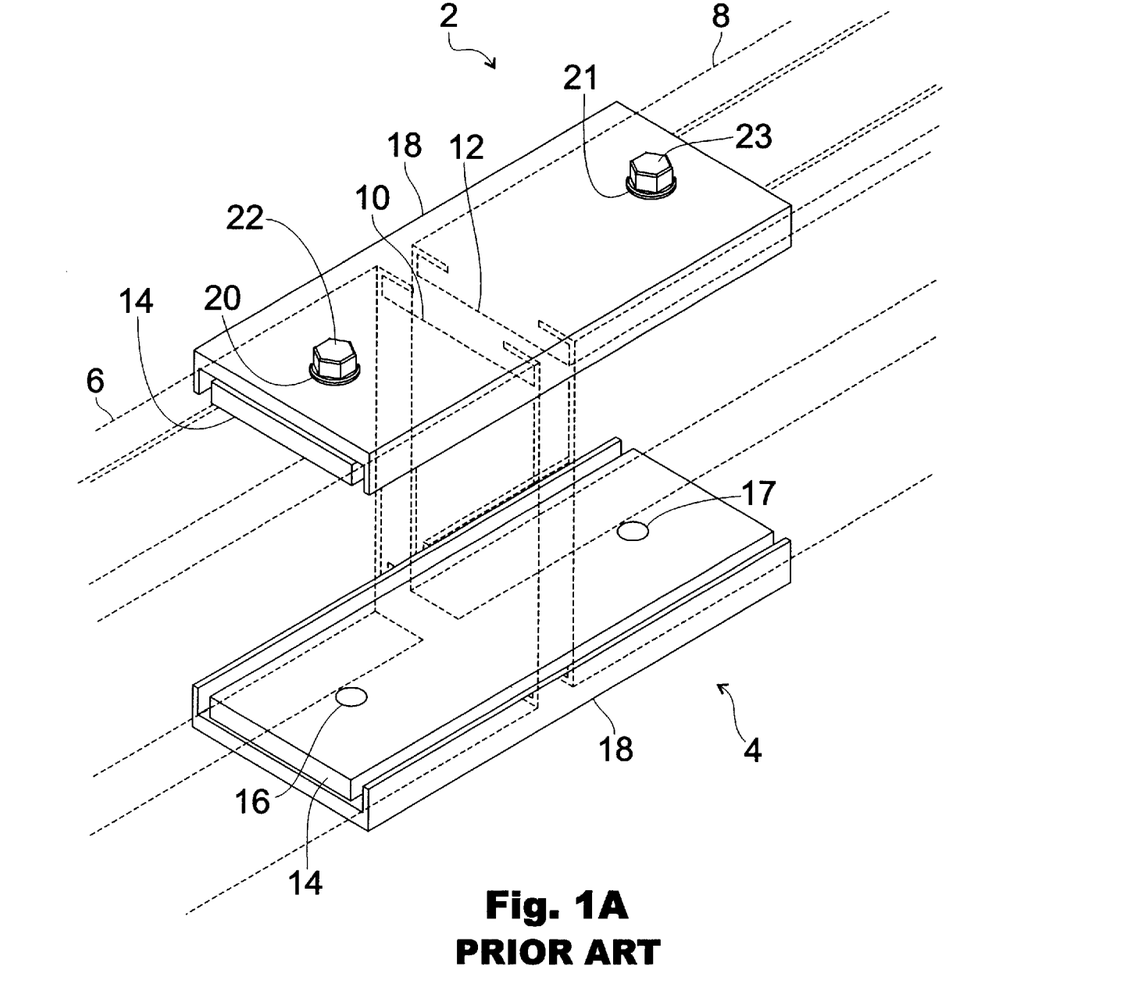
FIG. 1A is perspective view of a pair of prior art flat plate connector assemblies being used at the interface between two busbar housings to join the two busbar housings together.
Figure 1B:
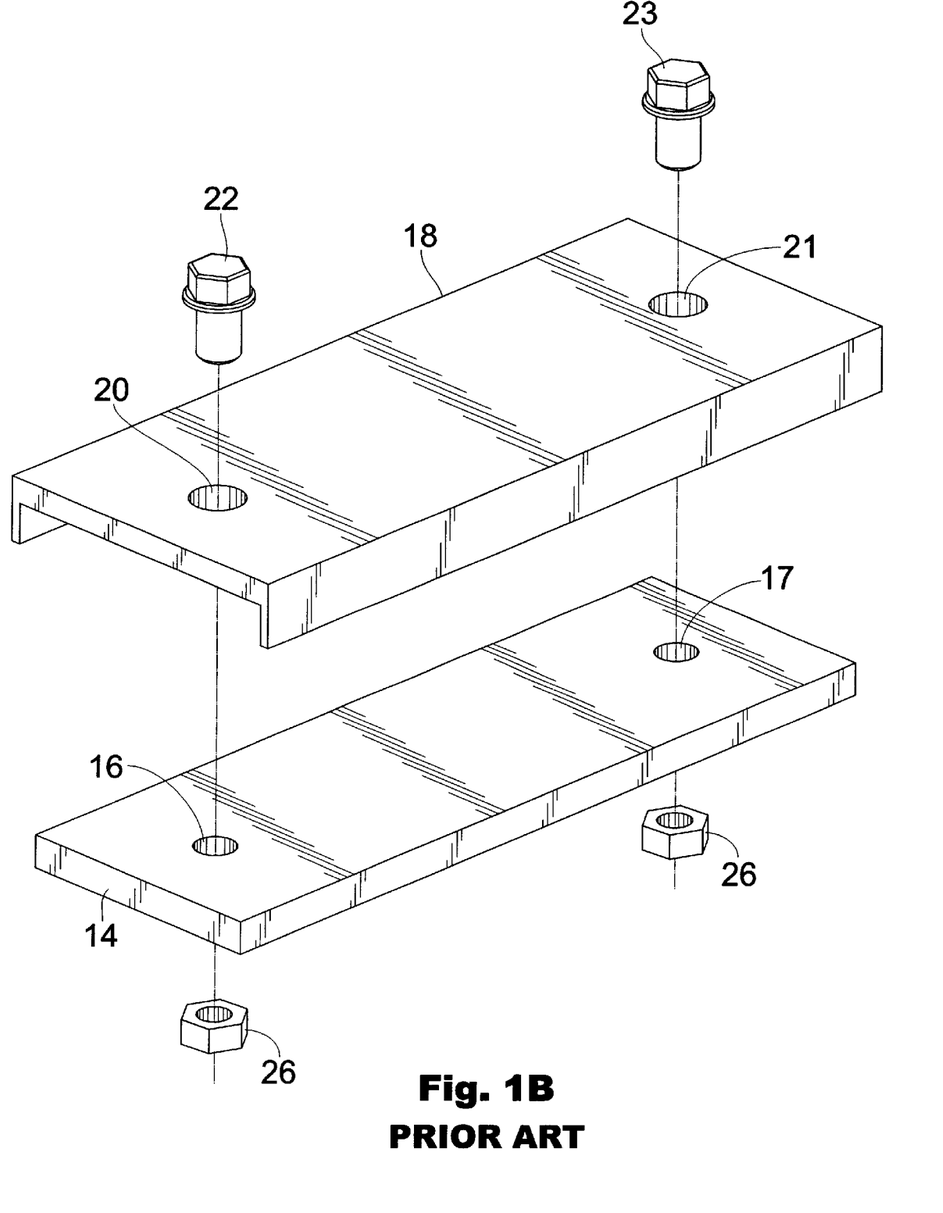
FIG. 1B is a perspective view of one of the prior art flat plate connector assemblies of FIG. 1A, separating the components of the flat plate connector assembly to more fully illustrate the design of each component.

Referring now to FIG. 1A there is illustrated a coupling system of the prior art which uses a pair of flat plate connector assemblies 2 and 4. Two sections of busway 6 and 8, shown in phantom in FIG. 1A can be connected by using the two flat plate connector assemblies 2 and 4, that sandwich a flange or similar feature at the ends 10 and 12 of the busway housing. Flat plate connector assemblies of the type of flat plate connector assemblies 2 and 4 are usually used in two sets, either top and bottom or side and side. Referring to both FIG. 1A and FIG. 1B, such flat plate connector assemblies of the type of flat plate connector assemblies 2 and 4 are each composed of a flat bottom plate 14 having a pair of throughholes 16 therethrough which may or may not be threaded, and a corresponding top plate, in this case the u-shaped top plate 18. The u-shaped top plate 18 includes throughholes 20 therethrough, which may or may not be threaded. Bolts 22 and 23 are typically inserted through the throughhole 20 and 21 respectively of u-shaped top plate 18, and into the corresponding throughhole 16 and 17 in flat bottom plate 14 whereupon, if the throughhole of the flat bottom plate is threaded, said bolt threadably engages said threaded throughhole, allowing the bolt to be tightened in order to draw the u-shaped top plate and the flat bottom plate together over the flanges at the ends 10 and 12 respectively of the busways 6 and 8. If the throughhole of the flat bottom plate 14 is not threaded, a nut 26 is threadably engaged with the bolt 22 to draw the flat bottom plate 14 and the u-shaped top plate 18 together. The frictional force between the flat bottom plate 14, the u-shaped top plate 18 and the flange of the respective housings 6 and 8 is intended to keep the adjoining housings 6 and 8 from separating. However, under loads, particularly where the housings 6 and 8 are supported overhead and span a substantial distance, the housings 6 and 8 tend to pull apart overtightening bolts 22 to provide additional compressive force generally results in stripping the threaded throughholes or nuts damaging and/or destroying the connector assembly.

Figure 2:
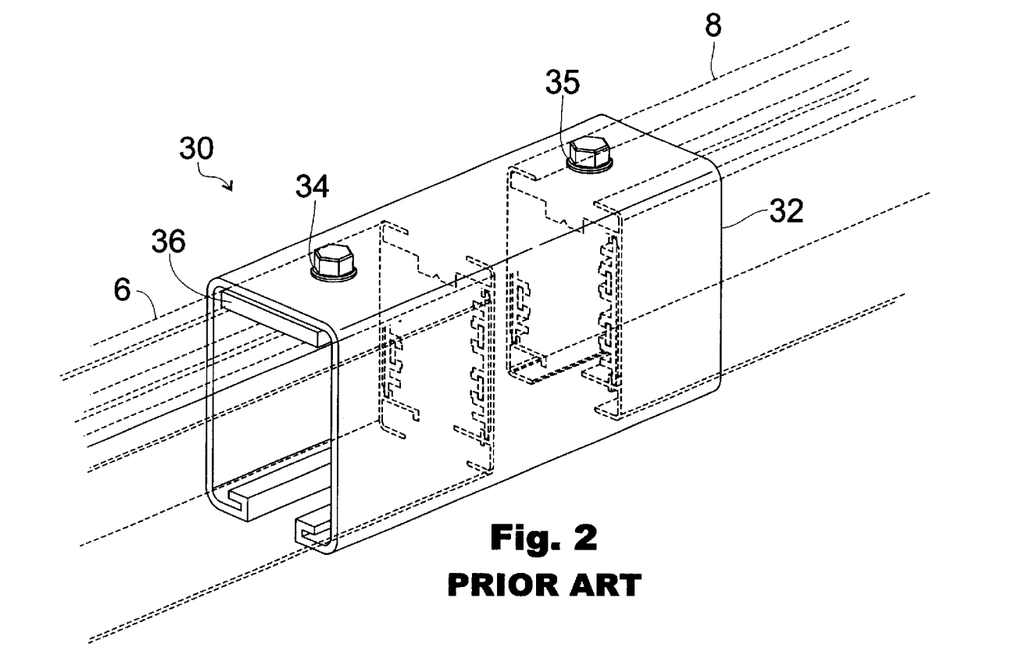
FIG. 2 is a perspective view of a prior art wrap-a-round connector assembly

Referring now to FIG. 2 there is illustrated a known wrap-around type connector 30. In this design, an aluminum extrusion 32 telescopes over the ends of housings 6 and 8 shown in phantom that are joined. Wrap-around connector 30 has two bolts 34 and 35 that tighten a plate 36 to create a frictional clamping force as described above in connection with the flat plate coupling assemblies 2 and 4. However, as may be appreciated, most of the support comes from the telescoping or wrap-a-round effect rather than the frictional clamping force.

Figure 3:
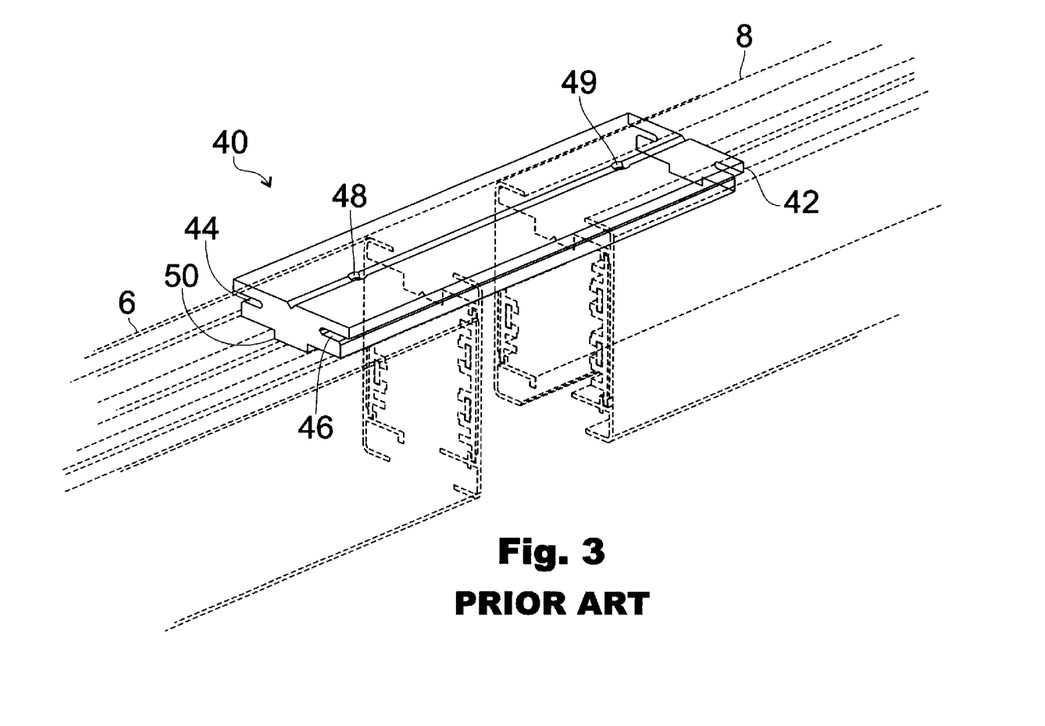
FIG. 3 is a perspective view of a prior art channel/set screw connector assembly.

Illustrated in FIG. 3 is yet another known connector generally referred to as a channel and set screw connector 40. An extruded piece of aluminum channel 42 is designed to slide loosely into each end of a pair of busbar housings 6 and 8 in phantom, where channels 44 and 46 engage corresponding lips on each of the busbar housings 6 and 8. Once the busway housings 6 and 8 are butted together, and the connector 40 is centered over the gap interface between the two housings 6 and 8, two or more setscrews 48 and 49 are tightened in throughholes through the connector 40 and through a corresponding channel in each housing corresponding to the lip 50 of the connector 40 in order to secure both the connector 40 and the two housings in place. Although the setscrews 48 and 49 keep the connector 40 from moving and the shape of the extrusion provides some support for keeping the two housings in line, particularly when the housings are supported overhead, the amount of gripping frictional force in this design to prevent separation of the housings is minimal.

All of the known embodiments described above suffer from the limitation that where the busbars housings are joined, particularly but not limited to larger busway systems (e.g. greater than 100 amps), where the busbar housings are installed overhead or along a wall the above described connectors provide insufficient force to hold the busbars tightly together. For example, this is particularly true for large busway systems supported overhead from a ceiling or other structure where the supports are placed at greater intervals from one another (e.g. 10 foot intervals versus 5 foot intervals). Greater spacing intervals between the supports is generally desired as fewer supports are needed to support the busway system as a whole, but as pointed out above, the known connectors between busway housing sections, particularly for the larger busway systems, cannot provide sufficient force to hold the busbar sections together over greater spacing intervals. For example, such designs typically cannot meet a United Laboratories Resistance to Bending Test 857-45, which uniformly tests the ability for such housings to withstand bending loads over such connectors.

There remains a strong felt need in the art for an electrical busbar housing system, and in particular a busbar housing coupling system that has greater resistance to bending at the joints where adjoining sections of housing are fastened together, end to end and are supported at as great an interval between supports as is practicable.

SUMMARY OF INVENTION

Accordingly, a primary object of this invention is to provide an electrical busway housing system that has greater strengths, greater load-carrying capabilities and greater resistance to bending, thereby enabling such housing systems to be mounted with hangers at greater intervals than are presently possible. The greater the strength of the system at a joint between adjoining housing sections, the greater the allowable distance between hangers from which the electrical busway housing system is hung.

The essence of this invention is an improved and novel coupling system. In the prior art, particularly the coupling systems illustrated in FIGS. 1A–3 and described above, a top plate and bottom plate are paired and operate to grip adjoining busway housing sections together and the top and bottom plates that are utilized to create the gripping force are smooth. In contrast, in the present invention a coupling system is disclosed with a markedly roughened surface on an area of one or more those portions of the top and/or bottom plate that are intended to contact and grip the busway housing. The components having such a roughened surface are preferably formed of a selected material which indents the contacted surface of the busway housing, thereby substantially increasing the amount of gripping force and increasing substantially the force necessary to separate the joined housing sections.

The roughened surface operates to increase the co-efficient of friction between the busway housing section and the top and/or bottom plates. The roughened surface may be in the form of serrations or other indentations on the surfaces of the top and/or bottom plates contacting the busway housing sections, or may be in the form of materials adhered to or formed within the surfaces, such as grits or other materials. The materials adhered to the surface may be adhered by any known process, including welding, soldering, brazing, chemical or other adhesives and the like. A particularly preferred embodiment comprises serrations in either the top or bottom plate of a material sufficiently rigid to deform the busway housing section when the busway housing section is clamped between the top and bottom plate. In an alternative embodiment of the present invention, the busway housing itself may also include a roughened surface on that portion of its surface contacting the top and bottom plates to further increase the co-efficient of friction between the top plate, bottom plate and the busway housing section gripped therebetween.

In one embodiment of the invention, the connecting assembly of the present invention is used to connect the bottoms of the adjoining housing sections together, but not the tops of the adjoining housing sections. In an alternative embodiment of the present invention connecting assembly of the present invention is used to connect the tops of the adjoining housing sections together but not the bottoms. In yet another embodiment of the present invention the novel connecting assembly of the present invention is used on both the top and bottom portion of interface between the two housing sections. Finally, as may be appreciated, the novel connecting assembly of the present invention may be used with wrap-around type connector assemblies illustrated in FIG. 2 as well the orientations of top, bottom and side are generally illustrated in FIG. 1A.

DETAILED DESCRIPTION OF THE INVENTION

In the following discussion, unless otherwise clear from the context of use, when used in reference to a surface of a component of the present invention, the word "outer" refers to surfaces that have no direct contact with the busway housing when the invention is installed to connect two sections of busway. Conversely, when so used, the word "inner" refers to surfaces that have at least some portions thereof in direct contact with the busway housing when the invention is so installed. "Inner" surfaces of the components of the invention face each other when the invention is installed to connect two sections of busway housing. When used in reference to components of the present invention, the word "top" is used to describe a component (e.g., the "top plate"), the outer surface of which faces away from the busway when the invention is installed to connect two sections of busway, as illustrated in FIG. 1A. Conversely, when so used "bottom" is used to describe a component of the invention (e.g., the "bottom plate"), the outer surface of which faces toward the busway when the invention is so installed.

To the extent necessary for an appreciation of the present invention, U.S. Pat. Nos. 6,039,584 and 6,105,741 both to Ross, and United Laboratories' Resistance To Bending Test 857-45 are hereby incorporated herein in their entirety.

Figure 4:
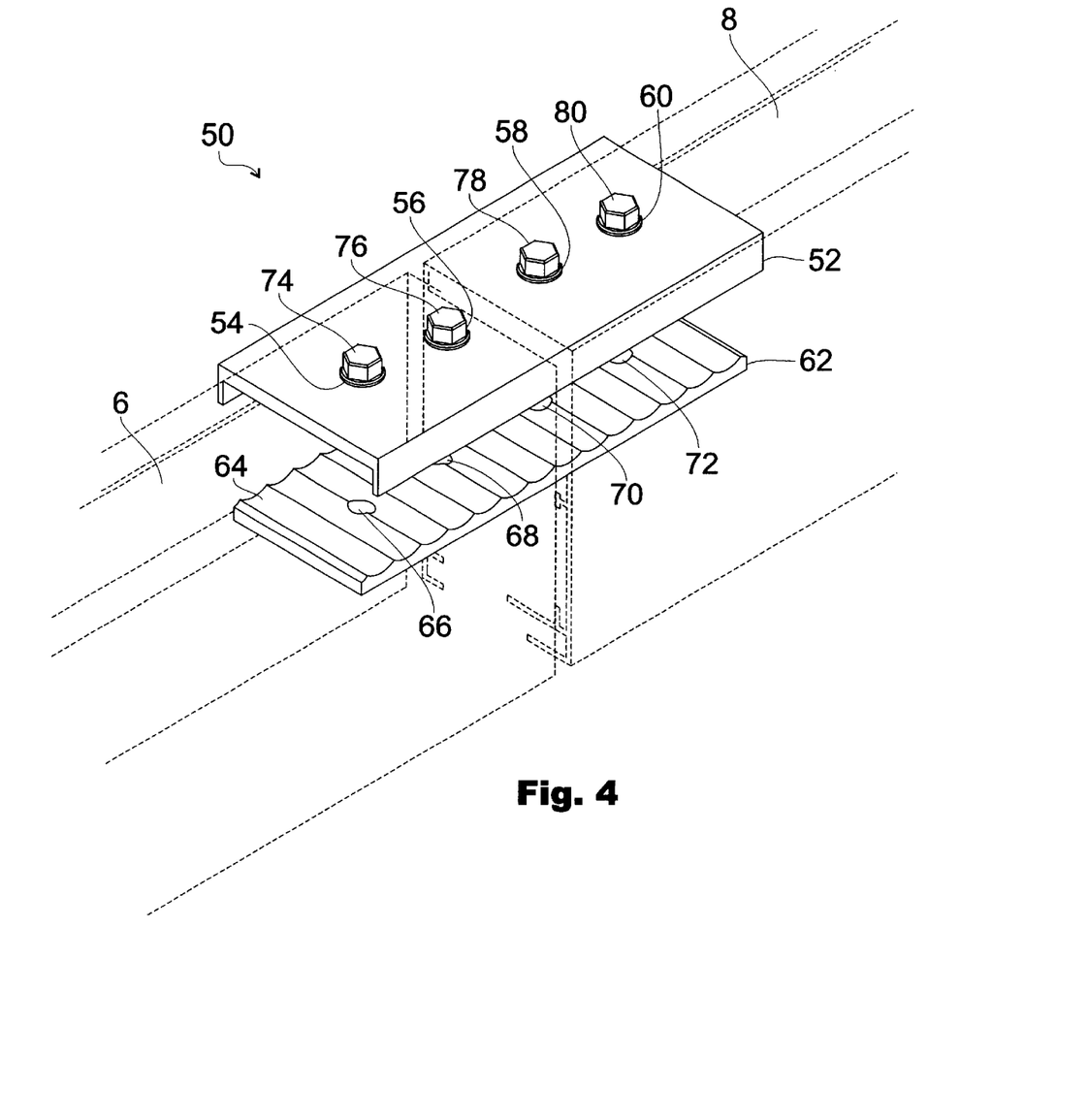
FIG. 4 is a perspective view illustrating a roughened bottom plate and top plate of a connector assembly of the present invention.

Referring now to FIG. 4 and in a view similar to FIG. 2, there is shown an embodiment of the present invention consisting of a busway housing connection assembly 50 comprising a top plate 52 having four throughholes 54, 56, 58 and 60 therethrough. Top plate 52 is illustrated as a u-shaped channel, but as may be appreciated the present invention is not so limited and the top plate may be a flat plate, a u-shaped channel or any other type of plate that will operate to cooperate with a bottom plate 62 described immediately below to grip a section of busway housing therebetween. Also illustrated in FIG. 4 is bottom plate 62 having a roughened inner surface 64 and four throughholes 66, 68, 70 and 72 therethrough which align and correspond with throughholes 54, 56, 58 and 60 respectively in top plate 52. Throughholes 66, 68, 70 and 72 in bottom plate 62 may or may not be threaded to receive four bolts 74, 76, 78 and 80 respectively. If said throughholes 66, 68, 70 and 72 in bottom plate 62 are threaded, bolts 74, 76, 78 and 80 may be inserted through the throughholes 54, 56, 58 and 60 in top plate 52 and threadably engaged in said throughholes 66, 68, 70 and 72 in bottom plate 62 and turned in order to draw top plate 52 and bottom plate 62 together. However, the invention is not limited to the use of four bolts to draw top plate 52 and bottom plate 62 together, and more or less bolts or screws, or rivets may also be used to draw the bottom plate 62 and the top plate 52 together. Where the throughholes 66, 68, 70, and 72 in bottom plate 62 are not threaded, top plate 52 and bottom plate 62 may be connected and drawn together by the use of nut and bolt assemblies or rivets for example.

As discussed below, the invention is not limited to embodiments in which the inner surface of the bottom plate 62 is roughened. In other embodiments, discussed below, only the inner surface of the top plate 52 is roughened. In yet other embodiments, the inner surfaces of both the top plate 52 and the bottom plate 62 are roughened.

The top plate 52 and bottom plate 62 may be manufactured of any suitable material providing sufficient strength and rigidity to firmly hold two sections of busway together when the busway housing connection assembly 50 is installed. However, when either the top plate 52 or the bottom plate 62 is manufactured with a roughened inner surface such as surface 64 of bottom plate 62 illustrated in FIG. 4, it is preferably manufactured of a material that is harder than the busway housing, so that the roughened inner surface of the top plate 52 or the bottom plate 62 respectively will indent the flanges or similar features of the busway housings 6 and 8 when said flanges or similar features are clamped between top plate 52 and bottom plate 62 and top plate 52 and bottom plate 62 are drawn together by tightening bolts 74, 76, 78 and 80, thus providing increased gripping force and strengthening the connection. In a most preferred embodiment, the busway housings 6 and 8 are made of aluminum and the top plate 52 and/or the bottom plate 62 are made of steel.

In an alternative embodiment of the invention not shown, all or part of the inner surface of the top plate 52 is also roughened, so that both the bottom plate 62 and the top plate 52 will increase the gripping force and the strength of the connection.

In yet another alternative embodiment, only top plate 52 is manufactured with a roughened inner surface contacting the busway housing.

Figure 5A:
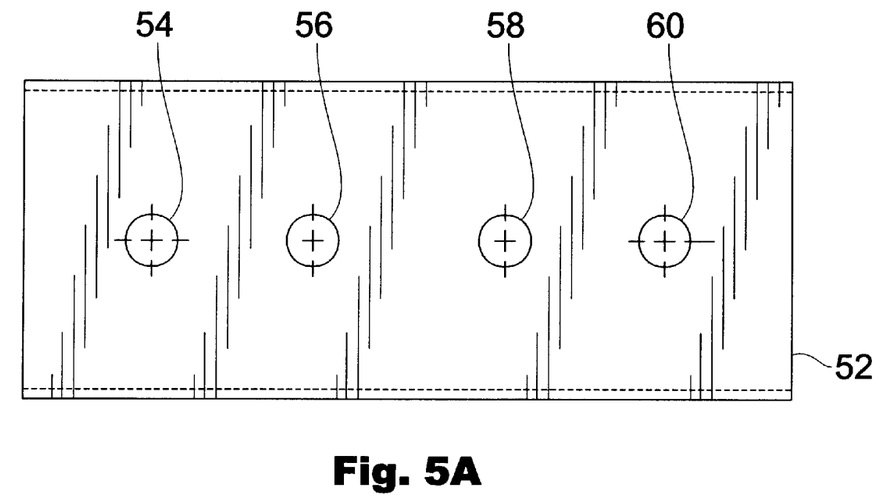
FIG. 5A is a top plan view of the top plate of a connector assembly of the present invention.
Figure 5B:
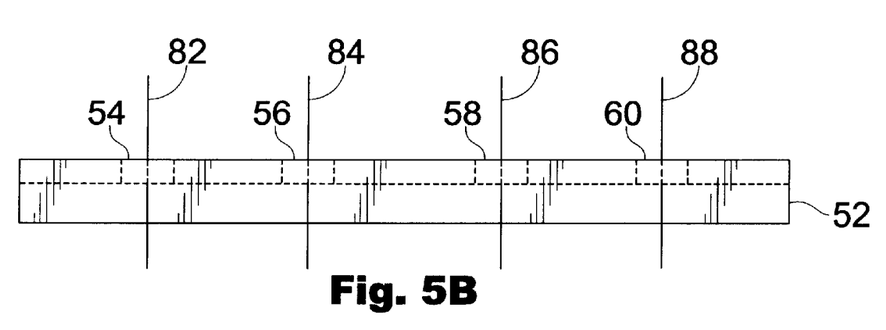
FIG. 5B is a side elevational view of the top plate of the connector assembly of the present invention.

FIGS. 5A and 5B show top plate 52 having the four throughholes 54, 56, 58 and 60 therethrough. FIG. 5A is a top view of top plate 52 showing the outer surface, while FIG. 5B is a side view of the same. FIG. 5B includes reference characters 82, 84, 86 and 88 illustrating the position of throughholes 54, 56, 58 and 60.

Figure 6A:
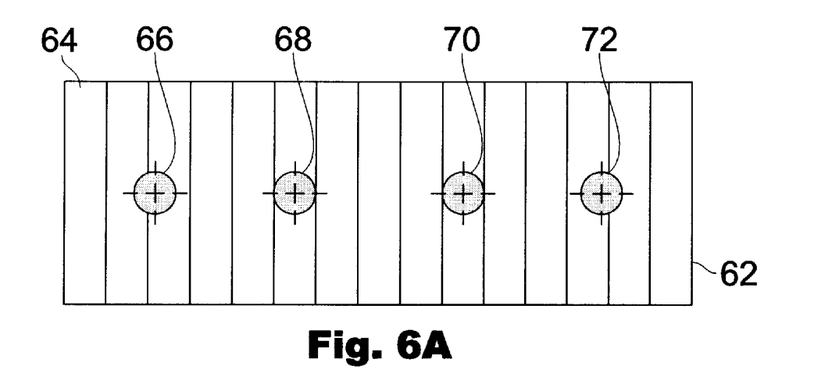
FIG. 6A is a top plan view of the roughened bottom plate of the connector assembly of the present invention.
Figure 6B:
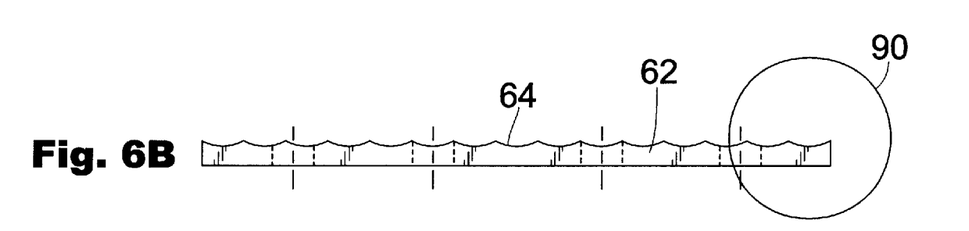
FIG. 6B is a side elevational view of the roughened bottom plate of the connector assembly of the present invention.

FIGS. 6A and 6B show bottom plate 62 having the four throughholes 66, 68, 70 and 72 (corresponding to throughholes 54, 56, 58 and 60 through top plate 52 as shown in FIGS. 5A and 5B). FIG. 6A is a top plan view of bottom plate 62 showing the roughened inner surface 64, while FIG. 6B is a side elevated view of the same.

Figure 6C:
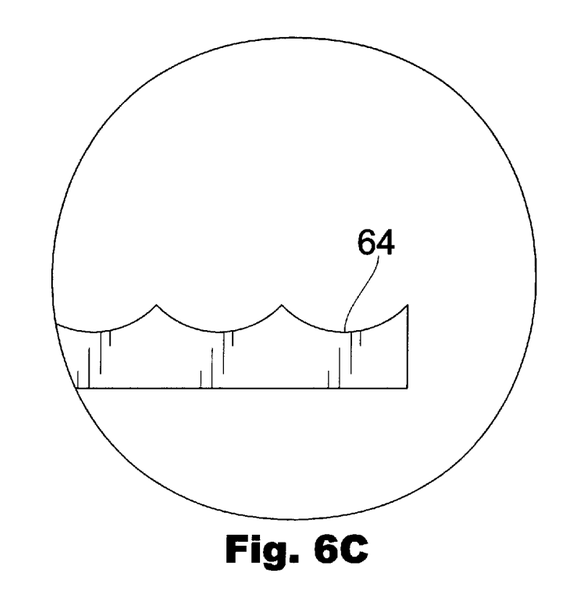
FIG. 6C is a side elevational view of an enlargement of a portion of the roughened bottom plate of FIG. 6B.

FIG. 6C is an enlarged side elevated view of the circle portion 90 of bottom plate 62 illustrated in FIG. 6B, showing in more detail the roughened inner surface 64.

FIGS. 4, 5A, and 5B all depict embodiments of top plate 52 having four throughholes 54, 56, 58 and 60 therethrough. Likewise, FIGS. 4, 6A, and 6B all depict bottom plate 62 having four throughholes 66, 68, 70 and 72 therethrough to accommodate four bolts to draw top plate 52 and bottom plate 62 together. These illustrations are exemplary only. Other embodiments of the invention may have more or fewer throughholes with an equal number of bolts or alternative fastening devices, as may be deemed necessary to provide sufficient connecting force between top plate 52 and bottom plate 62. All such embodiments are included within the scope of the present invention and include bolts into threaded throughholes 66, 68, 70 and 72, bolt and nut assemblies through throughholes 54, 56, 58 and 60 and 66, 68, 70 and 72, or screws or rivets or any similarly functioning devices which operate to draw bottom plate 62 and top plate 52 together.

FIGS. 4, 6A, 6B, and 6C depict bottom plate 62 having the roughened surface 64 in the form of serrations formed by pointed ridges running from side to side. However, as may be appreciated, the surface of either bottom plate 62 or top plate 52 may be roughened by any structural feature that will provide increased frictional gripping force on the flange or similar feature of the busway housing when the bolts 74, 76, 78 and 80 or other fastener connecting top plate 52 and bottom plate 62 are tightened. For example, and without limiting the scope of the invention, bottom plate 62 and/or top plate 52 may be manufactured with cone-shaped or other shaped teeth, and/or with friction increasing granules or films adhered therein or thereon to form the roughened surface 64. All embodiments of bottom plate 62 and top plate 52 having a roughened surface are within the scope of the present invention, regardless of the manner in which the surface is roughened.

In addition, it is not necessary that the entire inner surface of either bottom plate 62 or top plate 52 be roughened, as long as portions of said inner surface that are in direct contact with the busway housings 6 and 8 when installed are roughened. Accordingly, embodiments of bottom plate 62 and top plate 52 having only portions of the surface 64 that are roughened are likewise within the scope of the present invention.

In an alternative embodiment, both top plate 52 and bottom plate 62 have all or parts of their inner surfaces roughened so that the increased frictional gripping force is applied to both sides of the flange or other feature of the busway housings 6 and 8 when the invention is installed.

In a preferred embodiment, both top plate 52 and bottom plate 62 are manufactured of a selected material that is harder than the busway housings 6 and 8. Also in a preferred embodiment, where both of the surfaces of the top plate 52 and the bottom plate 62 contacting the busway housings are roughened, the structural features that form the roughened surfaces 64 of top plate 52 and bottom plate 62 fit together or overlap one another, as, for example, where the roughened surfaces are in the form of interlocking pointed ridges or teeth, such that the roughened surfaces of top plate 52 and bottom plate 62 cooperate to crimp the flange or similar feature of the busway housing when bolts 74, 76, 78 and 80 are tightened and top plate 52 and bottom plate 62 are drawn together.

Figure 7:
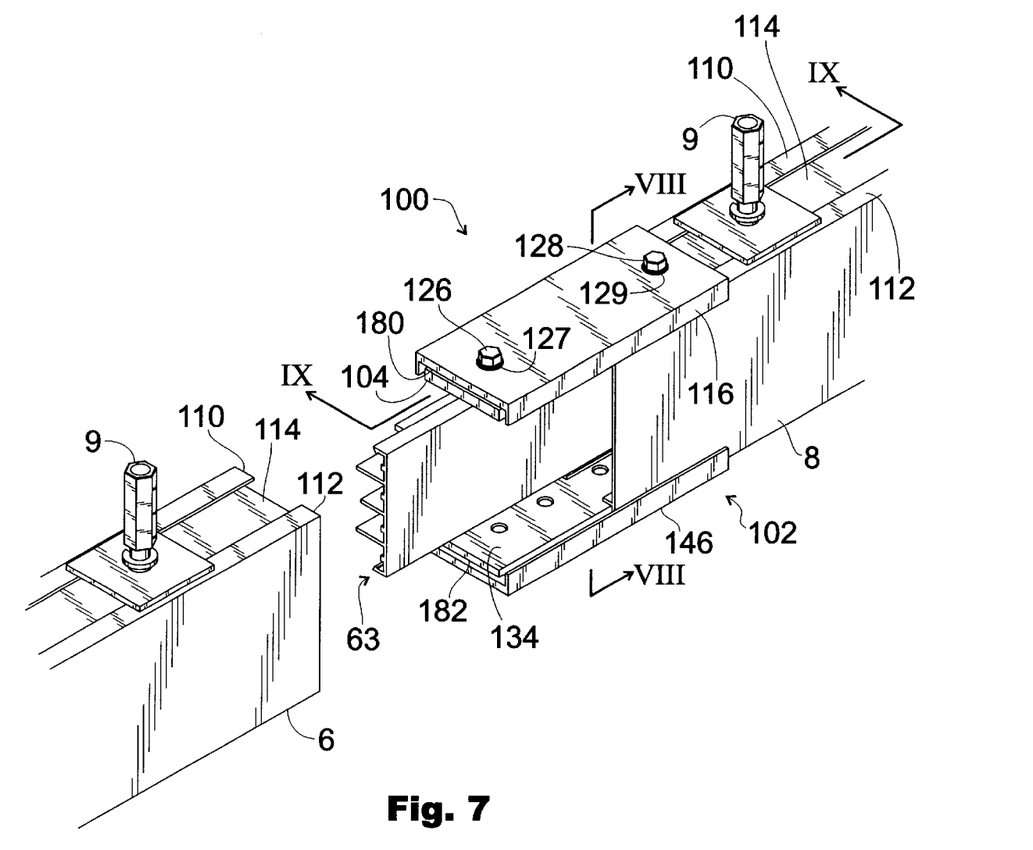
FIG. 7 is a perspective view illustrating an assembly of one embodiment of this invention illustrating the connection of two sections of busbar housing with the novel connector assembly of the present invention.
Figure 8:
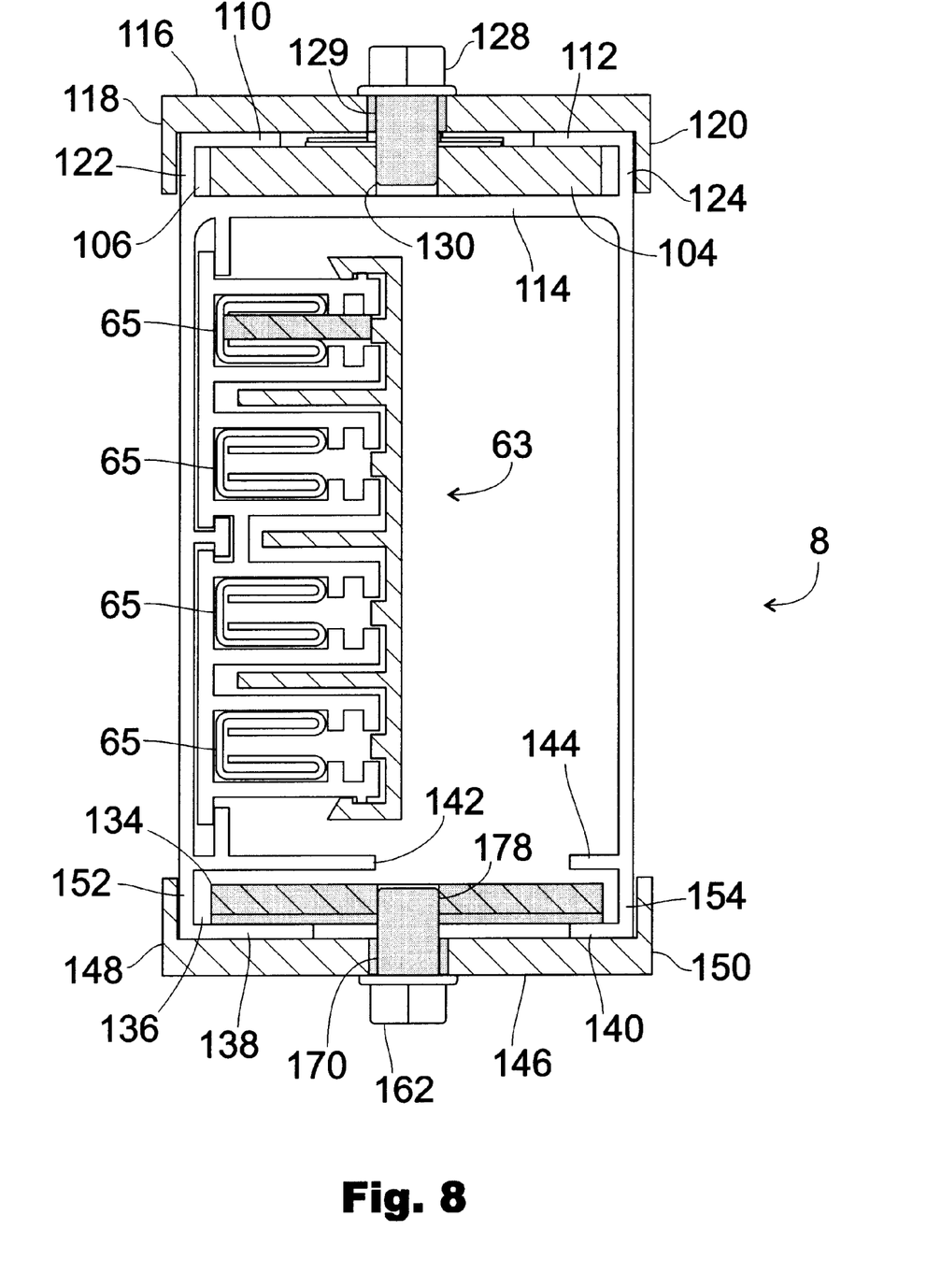
FIG. 8 is an elevational sectional view along the line VIII—VIII in FIG. 7.
Figure 9:
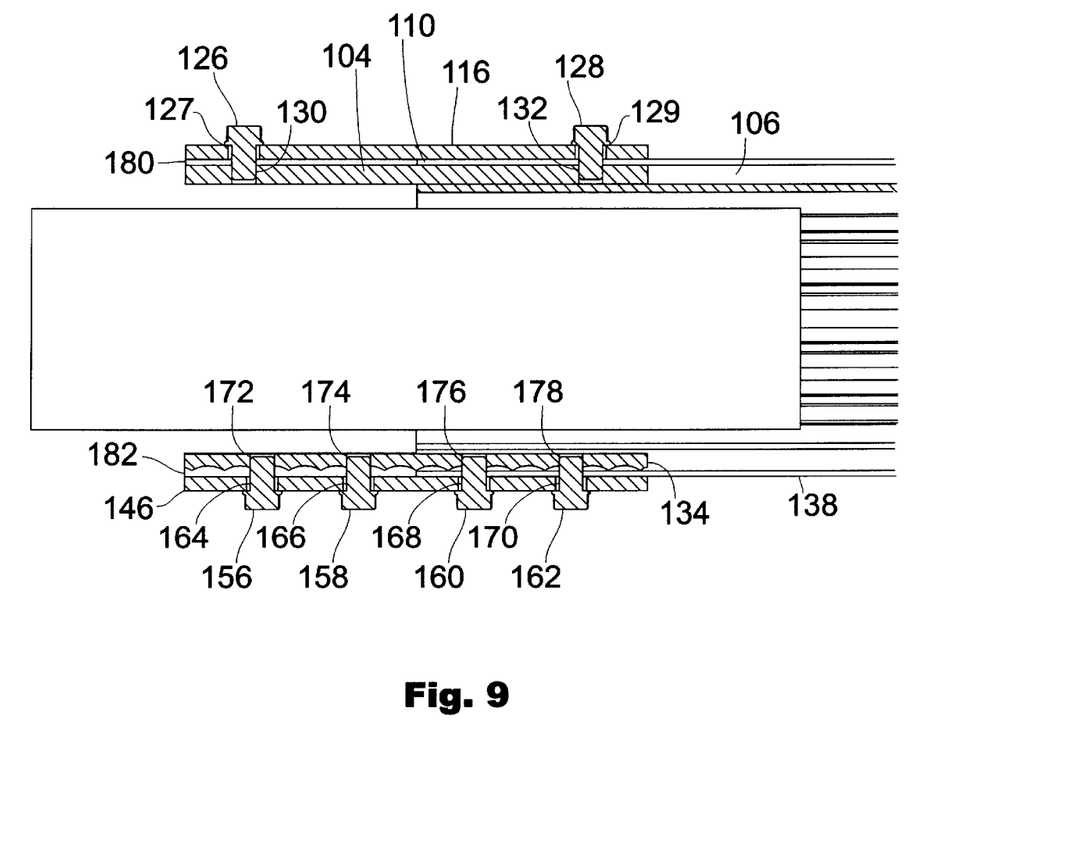
FIG. 9 is an elevational sectional view along the line IX—IX in FIG. 8.

FIG. 7 illustrates two busway housing connector assemblies 100 and 102 being installed to connect two busway housing sections 6 and 8. Busway housing section 8 is illustrated in FIG. 7 with a portion of busway assembly 63 protruding therefrom, as described in U.S. Pat. No. 6,039,584 referenced above. FIG. 8 illustrates the busway housing connector assemblies in cross section as installed at the end of a section of busway housing along the line VIII—VIII of FIG. 7. Conductive busbars 65 are shown as part of a busway assembly 63 installed within busway housing section 8. FIG. 9 illustrates the busway housing connector assemblies 100 and 102 in longitudinal cross section as installed at the end of a section of busway housing along the line IX—IX of FIG. 7.

As illustrated in FIGS. 7, 8 and 9, in order to connect two sections of busway housing 6 and 8, one bottom plate 104 is inserted up to approximately half of its length into the top recesses 106 formed by the upper inwardly projecting flanges 110 and 112 and roof member 114 at the top of busway housing section 8. A top plate 116 is then placed over bottom plate 104 and upper inwardly projecting flanges 110 and 112 with the sides 118 and 120 of the u-shaped portion extending downwardly along the sides 122 and 124 of the busway housing 8. Bolts 126 and 128 are inserted through the throughholes 127 and 129 respectively of top plate 116 and are loosely screwed into the threaded throughholes 130 and 132 of bottom plate 104. Another bottom plate 134 is likewise inserted up to approximately half of its length into the bottom recess 136 formed by the lower inwardly projecting flanges 138, 140, 142 and 144 at the bottom of busway housing section 8. Another top plate 146 is then fitted over the bottom plate 134 and lower inwardly projecting flanges 138 and 140 with the sides 148 and 150 of the top plate 146 extending upwardly along the sides 152 and 154 of the busway housing section 8. Again, bolts 156, 158, 160 and 162 are inserted through the throughholes 164, 166, 168 and 170 in top plate 146 and loosely screwed into the threaded throughholes 172, 174, 176 and 178 of bottom plate 134. The second section of busway housing section 6 can then be fitted into the interstitial spaces 180 and 182 respectively between the top plate 116 and bottom plate 104 and the top plate 146 and the bottom plate 134 by sliding the flanges of busway housing section 6 corresponding to upper inwardly projecting flanges and lower inwardly projecting flanges of busway housing section 8 into said spaces 180 and 182. When the two busway housing sections 6 and 8 are firmly butted against each other, the busway housing connector assemblies 100 and 102 are manually centered over the connection joint and bolts 126, 128, 156, 158, 160 and 162 are firmly tightened, drawing the respective top plates and bottom plates of the connector assemblies 100 and 102 together, so that upper inwardly projecting flanges and lower inwardly projecting flanges of both sections of busway housing sections 6 and 8 are firmly pressed therebetween. The roughened surface 184 of the bottom plate 134 provides heretofore unknown gripping strength to hold the busway housing sections 6 and 8 together. The inventors have found that this embodiment, even without roughening any or all of the remaining busway-contacting surfaces of the top plate 146, and/or top plate 116 and/or bottom plate 104 contacting the busway housing sections 6 and 8 in the interstitial spaces 180 and 182 respectively, is sufficient alone to cause the joined section to meet and/or surpass United Laboratories' Resistance To Bending Test 857-45. Roughening one or more of the remaining surfaces bounding spaces 180 and/or 182 only increases the ability of the connector assemblies 100 and 102 to hold the busway housing sections 6 and 8 together. The connected busway housing sections 6 and 8 may then be hung or supported by any means known in the art, as for example, by the hanger assemblies 9 illustrated in FIG. 7.

In another embodiment of the invention, a u-shaped wrap-around channel 32 of the type depicted in FIG. 2 illustrating the prior art is substituted for the top plates 116 and 146. However, rather than the simple bottom plate 36 used in the prior art, a bottom plate of the present invention with a roughened inner surface cooperates with the u-shaped wrap-around channel 32 to firmly hold the inwardly projecting flanges of two busway housing sections in place when the bolts connecting the u-shaped wrap-around channel 32 and the roughened surface bottom plate are tightened. In other embodiments of the invention, both the inner surface of the bottom plate 36 and the corresponding inner surface of the u-shaped wrap-around channel 32 are roughened. In yet other embodiments, only the inner surface of the u-shaped wrap-around channel 32 is roughened. As with other embodiments of the invention discussed herein, when either component, that is, either the u-shaped wrap-around channel 32 or the bottom plate 36 has a roughened surface, said component is preferably manufactured of a material that is harder than the busway housing sections that are to be connected in order to allow the roughened surface to indent the busway housing. Use of a roughened inner surface bottom plate 36 with a u-shaped wrap-around channel 32 combines the support of the telescoping or wrap-around effect of the u-shaped wrap-around channel 32 known in the prior art with the improved frictional clamping force provided by the roughened inner surface of the bottom plate 36 of the present invention. Roughening the corresponding surface of the u-shaped wrap-around channel 32 only operates to improve the frictional force gripping the busway housing sections to one another. It should be noted that, without limiting the invention to this manner of installation, embodiments employing a u-shaped wrap-around channel 32 are preferably installed such that the bottom plate 36 fits into the recesses formed by the bottom inwardly projecting flanges of the busway housing with the opening of the u-shaped wrap-around channel (corresponding to the top of the "U") at the top of the busway housing.

Although this invention has been described in terms of multiple embodiments, it is not intended that the invention be limited to these embodiments. Modification within the spirit of the invention will be apparent to those skilled in the art. The scope of the invention is defined by the claims that follow.

What is claimed is:

1. A coupling system for connecting two sections of electrical busway housing together comprising:
   a) a top plate;
   b) a bottom plate; and
   c) a means for drawing said top plate and said bottom plate together;
   wherein said top plate and said bottom plate operate to clamp therebetween at least a portion of a pair of busway housing sections to be connected by said coupling system;
   wherein a surface selected from a surface of said top plate contacting said busway housing sections, a surface of said bottom plate contacting said busway housing sections, and combinations thereof is roughened in order to provide increased gripping force between said coupling system and said busway housing sections when said top plate and said bottom plate are drawn together;
   wherein the means of drawing together said top plate and said bottom plate comprises one or more fasteners selected from the group consisting of a bolt/nut assembly, a rivet, a screw that threadably engages threads provided in a throughhole of said bottom plate, and a bolt that threadably engages threads provided in a throughhole of said bottom plate wherein said fastener is inserted through a throughhole in said top plate and an aligned throughhole in said bottom plate and operates to draw said top plate and said bottom plate together;
   wherein said busway housing sections are each manufactured of aluminum and have a pair of vertical sidewalls with free edges on both the top and bottom of said housing section and having inwardly-turned flanges along said free edges at the top and bottom wherein at least a portion of said flanges are clamped between said top plate and said bottom plate when said busway housing sections are connected with said coupling system;
   wherein said busway housing sections are connected by a pair of coupling systems consisting of a first coupling system and a second coupling system, each coupling system having a top plate and a bottom plate respectively, and wherein said first coupling system has no roughened surface in contact with said busway housing sections, and wherein said second coupling system has one or more roughened surfaces in contact with said busway housing sections;
   wherein at least a portion of said surface of said bottom plate of said second coupling system that comes into contact with said busway housing section is roughened; and
   wherein said bottom plate is manufactured of a selected material that is harder than the busway housing sections to be connected and the roughened surface is serrated, such that the roughened surface of said bottom plate deforms said busway housing sections when said bottom plate and said top plate are drawn tightly together about said busway housing section.

2. A coupling system for connecting two sections of electrical busway housing together comprising:
   a) a top plate;
   b) a bottom plate; and
   c) a means for drawing said top plate and said bottom plate together;
   wherein said top plate and said bottom plate operate to clamp therebetween at least a portion of a pair of busway housing sections to be connected by said coupling system;
   wherein a surface selected from a surface of said top plate contacting said busway housing sections, a surface of said bottom plate contacting said busway housing sections, and combinations thereof is roughened in order to provide increased gripping force between said coupling system and said busway housing sections when said top plate and said bottom plate are drawn together;
   wherein the means of drawing together said top plate and said bottom plate comprises one or more fasteners selected from the group consisting of a bolt/nut assembly, a rivet, a screw that threadably engages threads provided in a throughhole of said bottom plate, and a bolt that threadably engages threads provided in a throughhole of said bottom plate wherein said fastener is inserted through a throughhole in said top plate and an aligned throughhole in said bottom plate and operates to draw said top plate and said bottom plate together;
   wherein said busway housing sections are each manufactured of aluminum and have a pair of vertical sidewalls with free edges on both the top and bottom of said housing section and having inwardly-turned flanges along said free edges at the top and bottom wherein at least a portion of said flanges are clamped between said top plate and said bottom plate when said busway housing sections are connected with said coupling system;
   wherein said busway housing sections are connected by a pair of coupling systems consisting of a first coupling system and a second coupling system, each coupling system having a top plate and a bottom plate respectively, and wherein said first coupling system has no roughened surface in contact with said busway housing sections, and wherein said second coupling system has one or more roughened surfaces in contact with said busway housing sections;
   wherein at least a portion of said surface of said top plate of said second coupling system that comes into contact with said busway housing section is roughened; and
   wherein said top plate is manufactured of a selected material that is harder than the busway housing sections to be connected and the roughened surface is serrated, such that the roughened surface of said top plate deforms said busway housing sections when said bottom plate and said top plate are drawn tightly together about said busway housing section.

3. A coupling system for connecting two sections of electrical busway housing together comprising:
   a) a top plate;
   b) a bottom plate; and
   c) a means for drawing said top plate and said bottom plate together;
   wherein said top plate and said bottom plate operate to clamp therebetween at least a portion of a pair of busway housing sections to be connected by said coupling system;

wherein a surface selected from a surface of said top plate contacting said busway housing sections, a surface of said bottom plate contacting said busway housing sections, and combinations thereof is roughened in order to provide increased gripping force between said coupling system and said busway housing sections when said top plate and said bottom plate are drawn together;

wherein the means of drawing together said top plate and said bottom plate comprises one or more fasteners selected from the group consisting of a bolt/nut assembly, a rivet, a screw that threadably engages threads provided in a throughhole of said bottom plate, and a bolt that threadably engages threads provided in a throughhole of said bottom plate wherein said fastener is inserted through a throughhole in said top plate and an aligned throughhole in said bottom plate and operates to draw said top plate and said bottom plate together;

wherein said busway housing sections are each manufactured of aluminum and have a pair of vertical sidewalls with free edges on both the top and bottom of said housing section and having inwardly-turned flanges along said free edges at the top and bottom wherein at least a portion of said flanges are clamped between said top plate and said bottom plate when said busway housing sections are connected with said coupling system;

wherein said busway housing sections are connected by a pair of coupling systems consisting of a first coupling system and a second coupling system, each coupling system having a top plate and a bottom plate respectively, and wherein said first coupling system has no roughened surface in contact with said busway housing sections, and wherein said second coupling system has one or more roughened surfaces in contact with said busway housing sections;

wherein at least a portion of the surfaces of both said bottom plate and said top plate of said second coupling system that come into contact with said busway housing section is roughened; and wherein said bottom plate is manufactured of a selected material that is harder than the busway housing sections to be connected and the roughened surface is serrated, such that the roughened surface of said bottom plate deforms said busway housing sections when said bottom plate and said top plate are drawn tightly together about said busway housing section.

4. A coupling system for connecting two sections of electrical busway housing together comprising:
 a) a top plate;
 b) a bottom plate; and
 c) a means for drawing said top plate and said bottom plate together;

wherein said top plate and said bottom plate operate to clamp therebetween at least a portion of a pair of busway housing sections to be connected by said coupling system;

wherein a surface selected from a surface of said top plate contacting said busway housing sections, a surface of said bottom plate contacting said busway housing sections, and combinations thereof is roughened in order to provide increased gripping force between said coupling system and said busway housing sections when said top plate and said bottom plate are drawn together;

wherein the means of drawing together said top plate and said bottom plate comprises one or more fasteners selected from the group consisting of a bolt/nut assembly, a rivet, a screw that threadably engages threads provided in a throughhole of said bottom plate, and a bolt that threadably engages threads provided in a throughhole of said bottom plate wherein said fastener is inserted through a throughhole in said top plate and an aligned throughhole in said bottom plate and operates to draw said top plate and said bottom plate together;

wherein said busway housing sections are each manufactured of aluminum and have a pair of vertical sidewalls with free edges on both the top and bottom of said housing section and having inwardly-turned flanges along said free edges at the top and bottom wherein at least a portion of said flanges are clamped between said top plate and said bottom plate when said busway housing sections are connected with said coupling system;

wherein said busway housing sections are connected by a pair of coupling systems consisting of a first coupling system and a second coupling system, each coupling system having a top plate and a bottom plate respectively, and wherein said first coupling system has no roughened surface in contact with said busway housing sections, and wherein said second coupling system has one or more roughened surfaces in contact with said busway housing sections;

wherein at least a portion of the surfaces of both said bottom plate and said top plate of said second coupling system that come into contact with said busway housing section is roughened;

wherein the roughened surfaces of said bottom plate and said top plate are serrated and are designed to overlap such that said serrated surfaces cooperate to deform a portion of said flange of the busway housing sections that are being connected when said bottom plate and said top plate are drawn toward each other clamping said flange therebetween; and wherein said bottom plate is manufactured of a selected material that is harder than the busway housing sections to be connected and the roughened surface is serrated, such that the roughened surface of said bottom plate deforms said busway housing sections when said bottom plate and said top plate are drawn tightly together about said busway housing section.

5. A coupling system for connecting two sections of electrical busway housing together comprising:
 a) a top plate;
 b) a bottom plate; and
 c) a means for drawing said top plate and said bottom plate together;

wherein said top plate and said bottom plate operate to clamp therebetween at least a portion of a pair of busway housing sections to be connected by said coupling system;

wherein a surface selected from a surface of said top plate contacting said busway housing sections, a surface of said bottom plate contacting said busway housing sections, and combinations thereof is roughened in order to provide increased gripping force between said coupling system and said busway housing sections when said top plate and said bottom plate are drawn together;

wherein the means of drawing together said top plate and said bottom plate comprises one or more fasteners selected from the group consisting of a bolt/nut assembly, a rivet, a screw that threadably engages threads provided in a throughhole of said bottom plate, and a bolt that threadably engages threads provided in a throughhole of said bottom plate wherein said fastener is inserted through a throughhole in said top plate and an aligned throughhole in said bottom plate and operates to draw said top plate and said bottom plate together;

wherein said busway housing sections are each manufactured of aluminum and have a pair of vertical sidewalls with free edges on both the top and bottom of said housing section and having inwardly-turned flanges along said free edges at the top and bottom wherein at least a portion of said flanges are clamped between said top plate and said bottom plate when said busway housing sections are connected with said coupling system;

wherein said housing sections are joined by a coupling system having a u-shaped wrap around channel and a bottom plate, wherein said u-shaped wrap around channel is a wrap-around channel having a pair of opposed sidewalls extending vertically over a pair of opposed sidewalls of said busway housing sections, said sidewalls of said u-shaped wrap around channel further extending around and containing therein said busway housing sections;

wherein at least a portion of the surface of said bottom plate that comes into contact with said busway housing section is roughened; and wherein said bottom plate is manufactured of a selected material that is harder than the busway housing sections to be connected and the roughened surface is serrated, such that the roughened surface of said bottom plate deforms said busway housing sections when said bottom plate and said top plate are drawn tightly together about said busway housing section.

6. A coupling system for connecting two sections of electrical busway housing together comprising:

a) a top plate;

b) a bottom plate; and c) a means for drawing said top plate and said bottom plate together;

wherein said top plate and said bottom plate operate to clamp therebetween at least a portion of a pair of busway housing sections to be connected by said coupling system;

wherein a surface selected from a surface of said top plate contacting said busway housing sections, a surface of said bottom plate contacting said busway housing sections, and combinations thereof is roughened in order to provide increased gripping force between said coupling system and said busway housing sections when said top plate and said bottom plate are drawn together;

wherein the means of drawing together said top plate and said bottom plate comprises one or more fasteners selected from the group consisting of a bolt/nut assembly, a rivet, a screw that threadably engages threads provided in a throughhole of said bottom plate, and a bolt that threadably engages threads provided in a throughhole of said bottom plate wherein said fastener is inserted through a throughhole in said top plate and an aligned throughhole in said bottom plate and operates to draw said top plate and said bottom plate together;

wherein said busway housing sections are each manufactured of aluminum and have a pair of vertical sidewalls with free edges on both the top and bottom of said housing section and having inwardly-turned flanges along said free edges at the top and bottom wherein at least a portion of said flanges are clamped between said top plate and said bottom plate when said busway housing sections are connected with said coupling system;

wherein said housing sections are joined by a coupling system having a u-shaped wrap around channel and a bottom plate, wherein said u-shaped wrap around channel is a wrap-around channel having a pair of opposed sidewalls extending vertically over a pair of opposed sidewalls of said busway housing sections, said sidewalls of said u-shaped wrap around channel further extending around and containing therein said busway housing sections;

wherein at least a portion of the surfaces of both said bottom plate and said u-shaped wrap-around channel that come into contact with said busway housing section is roughened; and wherein said bottom plate is manufactured of a selected material that is harder than the busway housing sections to be connected and the roughened surface is serrated, such that the roughened surface of said bottom plate deforms said busway housing sections when said bottom plate and said top plate are drawn tightly together about said busway housing section.

7. A coupling system for connecting two sections of electrical busway housing together comprising:

a) a top plate;

b) a bottom plate; and c) a means for drawing said top plate and said bottom plate together;

wherein said top plate and said bottom plate operate to clamp therebetween at least a portion of a pair of busway housing sections to be connected by said coupling system;

wherein a surface selected from a surface of said top plate contacting said busway housing sections, a surface of said bottom plate contacting said busway housing sections, and combinations thereof is roughened in order to provide increased gripping force between said coupling system and said busway housing sections when said top plate and said bottom plate are drawn together;

wherein the means of drawing together said top plate and said bottom plate comprises one or more fasteners selected from the group consisting of a bolt/nut assembly, a rivet, a screw that threadably engages threads provided in a throughhole of said bottom plate, and a bolt that threadably engages threads provided in a throughhole of said bottom plate wherein said fastener is inserted through a throughhole in said top plate and an aligned throughhole in said bottom plate and operates to draw said top plate and said bottom plate together;

wherein said busway housing sections are each manufactured of aluminum and have a pair of vertical sidewalls with free edges on both the top and bottom of said housing section and having inwardly-turned flanges along said free edges at the top and bottom wherein at least a portion of said flanges are clamped between said top plate and said bottom plate when said busway housing sections are connected with said coupling system;

wherein said busway housing sections are connected by a pair of coupling systems consisting of a first coupling system and a second coupling system, each coupling system having a top plate and a bottom plate respectively, and wherein said first coupling system has no roughened surface in contact with said busway housing sections, and wherein said second coupling system has one or more roughened surfaces in contact with said busway housing sections;

wherein at least a portion of the surfaces of both said bottom plate and said top plate of said second coupling system that come into contact with said busway housing section is roughened; and wherein said top plate is manufactured of a selected material that is harder than the busway housing sections to be connected and the roughened surface is serrated, such that the roughened surface of said top plate deforms said busway housing sections when said bottom plate and said top plate are drawn tightly together about said busway housing section.

8. A coupling system for connecting two sections of electrical busway housing together comprising:

a) a top plate;

b) a bottom plate; and c) a means for drawing said top plate and said bottom plate together;

wherein said top plate and said bottom plate operate to clamp therebetween at least a portion of a pair of busway housing sections to be connected by said coupling system;

wherein a surface selected from a surface of said top plate contacting said busway housing sections, a surface of said bottom plate contacting said busway housing sections, and combinations thereof is roughened in order to provide increased gripping force between said coupling system and said busway housing sections when said top plate and said bottom plate are drawn together;

wherein the means of drawing together said top plate and said bottom plate comprises one or more fasteners selected from the group consisting of a bolt/nut assembly, a rivet, a screw that threadably engages threads provided in a throughhole of said bottom plate, and a bolt that threadably engages threads provided in a throughhole of said bottom plate wherein said fastener is inserted through a throughhole in said top plate and an aligned throughhole in said bottom plate and operates to draw said top plate and said bottom plate together;

wherein said busway housing sections are each manufactured of aluminum and have a pair of vertical sidewalls with free edges on both the top and bottom of said housing section and having inwardly-turned flanges along said free edges at the top and bottom wherein at least a portion of said flanges are clamped between said top plate and said bottom plate when said busway housing sections are connected with said coupling system;

wherein said busway housing sections are connected by a pair of coupling systems consisting of a first coupling system and a second coupling system, each coupling system having a top plate and a bottom plate respectively, and wherein said first coupling system has no roughened surface in contact with said busway housing sections, and wherein said second coupling system has one or more roughened surfaces in contact with said busway housing sections;

wherein at least a portion of the surfaces of both said bottom plate and said top plate of said second coupling system that come into contact with said busway housing section is roughened;

wherein the roughened surfaces of said bottom plate and said top plate are serrated and are designed to overlap such that said serrated surfaces cooperate to deform a portion of said flange of the busway housing sections that are being connected when said bottom plate and said top plate are drawn toward each other clamping said flange therebetween; and wherein said top plate is manufactured of a selected material that is harder than the busway housing sections to be connected and the roughened surface is serrated, such that the roughened surface of said top plate deforms said busway housing sections when said bottom plate and said top plate are drawn tightly together about said busway housing section.

* * * * *